Dec. 2, 1958     J. REIERSEN     2,862,733
OUTBOARD BEARING SEAL FOR MARINE PROPELLERS
Filed June 14, 1955
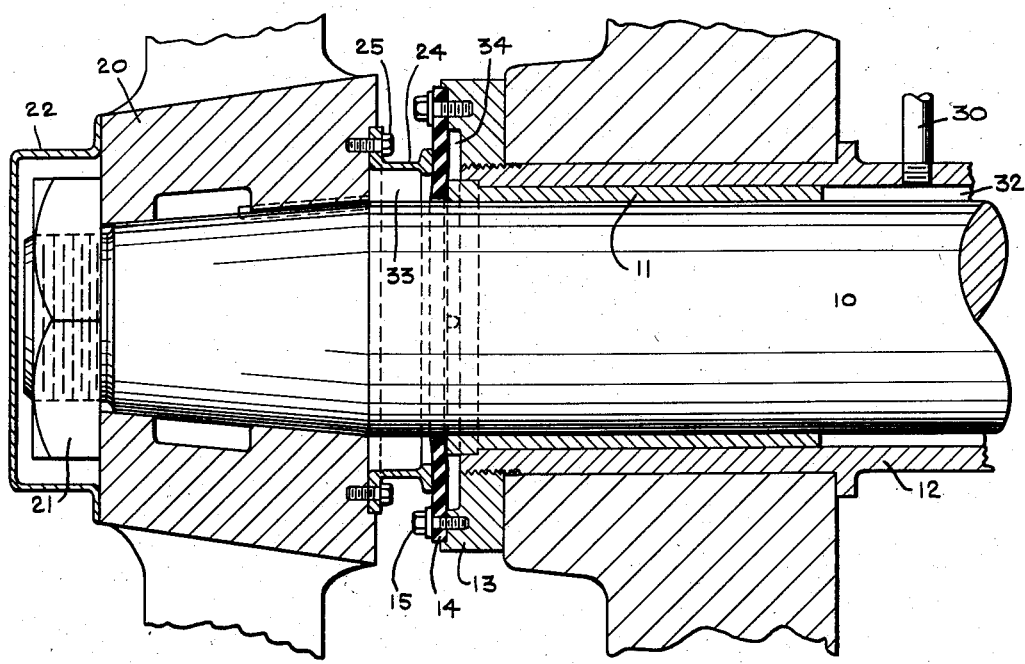
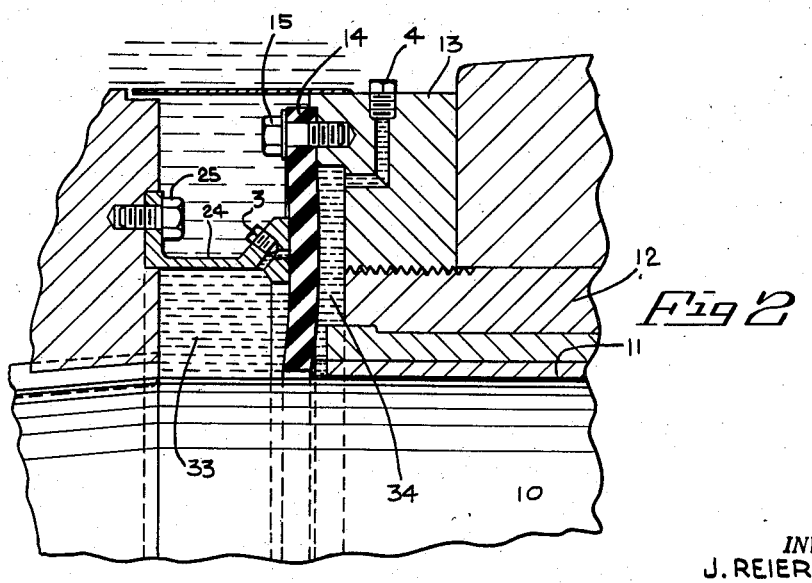
INVENTOR.
J. REIERSEN
BY
Edwin S. Hall
ATTORNEY.

United States Patent Office 2,862,733
Patented Dec. 2, 1958

2,862,733

OUTBOARD BEARING SEAL FOR MARINE PROPELLERS

John Reiersen, Brooklyn, N. Y.

Application June 14, 1955, Serial No. 515,387

1 Claim. (Cl. 286—8)

This invention relates to oil seals applicable especially to outboard bearings of marine propeller shafts.

An object of the invention is to provide an oil seal structure of few and simple parts which will insure oil lubrication of the propeller shaft bearing and prevent water from coming in contact with the propeller shaft. In other words, an object of the invention is to provide a complete closure about the outboard end of the propeller shaft, a closure which will effectively maintain the shaft in an oil bath sealed from corrosion by the water in which the propeller operates. Another object is to avoid the concentration of stress usually encountered in the shaft at the plane of the inboard face of the propeller hub or at the plane of the outboard end of the propeller-shaft sleeve when a bronze sleeve is used to protect a steel shaft from corrosion.

Another object of the invention is to provide means to actuate the oil seal by maintaining the oil under pressure somewhat more than the fluid pressure of the water in which the propeller operates.

These and other objects of the invention will be readily understood from the following description in connection with the drawings in which:

Fig. 1 is a longitudinal section of the invention; and

Fig. 2 is an enlarged view of a portion of another longitudinal section.

Referring to the drawings, propeller shaft 10 is operable in outboard bearing 11 mounted in the outer end of housing tube 12. Flange 13 is secured to the end of tube 12. Seal ring 14 is secured to flange 13 by screws 15. Seal ring 14 is made of a suitable flexible material such as synthetic rubber.

Propeller hub 20 may be keyed onto the tapered end of shaft 10 and locked by nut 21. Nut 21 may be sealed by cover 22 to prevent contact of water with nut 21 and the end of shaft 10. Cylindrical ring 24 is secured to hub 20 by screws 25, and is long enough to run in contact with seal ring 14 deflected enough to insure a long-lived sealing action.

Before the ship is launched, lubricating oil may flow thru pipe 30 into annular space 32 surrounding shaft 10, and thru bearing 11 to fill spaces 33 and 34 when vent plugs 3 and 4 are removed. As soon as the air is vented, plugs 3 and 4 may be replaced, the spaces remain filled with oil, and shaft 10 may run with flooded lubrication in bearing 11. The supply tank from which oil flows to the bearing thru pipe 30 may be sufficiently above the water line to maintain the specific fluid pressure on the inboard face of seal ring 14 higher than the specific pressure of the water on its outer face. As an alternative, pump means may be used to maintain the desired pressure difference to maintain seal rings 14, in proper running contact with cylindrical ring 24. Once contact has been established between seal ring 14 and cylindrical ring 24, the inboard area of seal ring 14 exposed to oil pressure in chamber 34 is greater than the unsupported outboard area of seal ring 14 exposed to water pressure outside the periphery of cylindrical ring 24, the difference in areas being substantially equal to the end area of cylindrical ring 24. Even if the specific pressures of the oil and water were the same, this difference in areas subject to fluid pressures tends to keep seal ring 14 in sealing contact with cylindrical ring 24.

Having thus described the invention, it is clear that its objects as stated have been attained in a simple and practical manner. While a single embodiment of the invention has been shown and described, it is understood that changes may be made in the structure and in the arrangement of the various parts without departing from the spirit or scope of the invention as defined in the following claim.

I claim:

A seal between an outboard bearing structure and a marine propeller shaft, said outboard bearing structure having an axially extending annular flange concentric with and radially spaced from said shaft, said seal comprising a flexible annular disc closely surrounding said shaft and secured to said flange, a metallic cylindrical ring attached to said shaft and extending in concentric, radially spaced relation thereto toward said flexible annular disc, said ring being radially closer to the shaft than said annular flange, whereby a radially intermediate portion of said flexible annular disc is pressed against the end of said metallic ring by its own resilience and by differential fluid pressures.

References Cited in the file of this patent

UNITED STATES PATENTS

| | | |
|---|---|---|
| 1,399,421 | Cedervall | Dec. 6, 1921 |
| 1,511,868 | Asbury | Oct. 14, 1924 |
| 1,512,261 | Allen | Oct. 21, 1924 |
| 1,803,510 | Schmieding et al. | May 5, 1931 |
| 2,167,669 | Molyneux | Aug. 1, 1939 |
| 2,281,156 | Johnson | Apr. 28, 1942 |

FOREIGN PATENTS

| | | |
|---|---|---|
| 6,004 | Great Britain | Mar. 10, 1914 |
| 11,581 | Great Britain | June 26, 1900 |